(12) United States Patent
Julicher et al.

(10) Patent No.: US 7,498,755 B2
(45) Date of Patent: Mar. 3, 2009

(54) BRUSHED MOTOR CONTROL WITH VOLTAGE BOOST FOR REVERSE AND BRAKING

(75) Inventors: Joseph Julicher, Maricopa, AZ (US); John Charais, Phoenix, AZ (US); Keith Curtis, Gilbert, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 166 days.

(21) Appl. No.: 11/680,820

(22) Filed: Mar. 1, 2007

(65) Prior Publication Data
US 2008/0253753 A1  Oct. 16, 2008

(51) Int. Cl.
*H02P 7/00* (2006.01)
(52) U.S. Cl. .................. 318/293; 318/34; 318/65
(58) Field of Classification Search ............ 318/293, 318/244, 245; 388/800, 825
See application file for complete search history.

(56) References Cited

U.S. PATENT DOCUMENTS

| | | | | |
|---|---|---|---|---|
| 5,990,644 A | * | 11/1999 | Furuya et al. | 318/293 |
| 6,384,555 B1 | * | 5/2002 | Tanaka | 318/280 |
| 6,867,563 B2 | * | 3/2005 | Ohshima | 318/434 |
| 6,956,342 B1 | * | 10/2005 | Fang | 318/400.08 |
| 7,348,740 B2 | * | 3/2008 | Ma et al. | 318/254.2 |

FOREIGN PATENT DOCUMENTS

EP  0023623 A  2/1981

OTHER PUBLICATIONS

International Search Report and Written Opinion from PCT/US2008/055269 mailed Jul. 1, 2008.

* cited by examiner

*Primary Examiner*—Bentsu Ro
*Assistant Examiner*—David S Luo
(74) *Attorney, Agent, or Firm*—Baker Botts L.L.P.

(57) ABSTRACT

A single low side power transistor switch is used to efficiently control a brushed motor in a forward rotational direction. A boost voltage power supply is used to supply voltage to the brushed motor in a reverse rotational direction and/or braking from the forward rotational direction. A digital device controls the brushed motor rotational speed and rotational directions.

19 Claims, 7 Drawing Sheets

Figure 1 (Prior Technology)

*Figure 2 (Prior Technology)*

*Figure 3 (Prior Technology)*

BRUSHED MOTOR CONTROL WITH VOLTAGE BOOST FOR REVERSE AND BRAKING

TECHNICAL FIELD

The present disclosure relates to motor speed control, and more particularly, to high efficiency motor speed control using voltage boost for reverse and braking of the motor.

BACKGROUND

A typical bi-direction motor speed control relies on an arrangement of switching devices called an H-Bridge. The H-Bridge arrangement allows current through the motor to be steered in one of two directions permitting forward or reverse rotation of the motor. In the H-Bridge arrangement, current in the motor flows through two switching devices at all times. Each switching device causes a loss in efficiency. Typical brushed motor speed controls use a solid state H-bridge to reverse the voltage across the motor. This H-bridge can also be used for motor braking. Unfortunately, the H-bridge causes two switching devices to be in series with the motor which can reduce the operating voltage, increase power dissipation, and decrease efficiency. In many applications, reverse rotation of the motor does not need to have the same performance as forward rotation of the motor. One example is in an electric car. In these cases, forward rotation is much more important to provide the maximum efficiency than for an auxiliary reverse rotation.

Referring to FIG. 1, depicted is a schematic block diagram of a prior technology H-bridge for controlling a motor in forward and reverse directions. A switching configuration for controlling current direction through a motor 102, (i.e., for switching voltage polarities at the motor 102 terminals) comprises power transistors 102, 104, 106 and 108 arranged in an H-bridge configuration. The power transistors 104 and 110 are adapted to couple the motor 102 to a voltage source 112 ($V_{BUS}$) and the power transistors 106 and 108 are adapted to couple the motor 102 to a return (ground or common) 114 of the voltage source 112, e.g., battery (see FIG. 7), depending upon the desired direction of rotation of the motor 102. The power transistors 102, 104, 106 and 108 may be controlled on and off by control signals at gate inputs 124, 126, 128 and 130, respectively.

Referring to FIG. 2, depicted is a schematic block diagram of the H-bridge of FIG. 1 configured for the forward direction of the motor. When it is desired for the motor 102 to rotate in a forward direction (e.g., arbitrarily selected herein for illustrative purposes), the power transistors 110 and 106 are switched on by the control signals 130 and 126, respectively, and the power transistors 104 and 108 are switched off by the control signals 124 and 128, respectively. This switched configuration will allow current to flow through the motor 102 in a direction 250 (also indicated by heavier lines of the schematic).

Referring to FIG. 3, depicted is a schematic block diagram of the H-bridge of FIG. 1 configured for the reverse direction of the motor. When it is desired for the motor 102 to rotate in a reverse direction (e.g., arbitrarily selected herein for illustrative purposes), the power transistors 104 and 108 are switched on by the control signals 124 and 128, respectively, and the power transistors 110 and 106 are switched off by the control signals 130 and 126, respectively. This switched configuration will allow current to flow through the motor 102 in a direction 350 (also indicated by heavier lines of the schematic) opposite to the current flow direction 250 shown in FIG. 2.

By switching the current flow to either direction 250 or direction 350 (i.e., reversing the motor 102 terminals coupled to the voltage source 112 and the voltage source return 114) the motor 102 rotation may be reversed. However, there are always two of the power transistors in the current flow path, thus creating power losses through these two power transistors.

SUMMARY

Therefore, there is a need for a more efficient and cost effective forward rotational control of a brushed motor operating from direct current (DC) power. According to the teachings of this disclosure, it is possible to construct a motor controller with only one switching device in series with the motor when operated in a primary rotational direction, e.g., forward rotation. Secondary, e.g., reverse, rotation may be performed with a boost power supply, and a series connect diode and power transistor but at a lower efficiency than the primary (forward) power control configuration. Thus best efficiency and performance of the brushed motor control may be realized when running the motor in a primary rotational direction (forward rotation) but still allow reverse and braking operations for the brushed motor.

According to a specific example embodiment of this disclosure, an apparatus for controlling rotation direction and speed of a brushed motor may comprise: a brushed motor having a first power terminal connected to a voltage source; a first power transistor coupled between a voltage source return and a second power terminal of the brushed motor; a voltage boost inductor; a second power transistor; a third power transistor; and a power diode; wherein one end of the voltage boost inductor is coupled to the voltage source, the other end of the voltage boost inductor is coupled to the third power transistor and the power diode, the third power transistor is coupled between the voltage source return and the voltage boost inductor, and the second power transistor is coupled between the power diode and the second power terminal of the motor; whereby when the first power transistor is on and the second power transistor is off the brushed motor rotates in a first direction, when the second transistor is on and the first transistor is off the brushed motor rotates in a second direction, and when the third power transistor is on current flows through the voltage boost inductor from the voltage source to the voltage source return.

According to another specific example embodiment of this disclosure, a method for controlling rotation direction and speed of a brushed motor may comprise the steps of: providing a brushed motor having a first power terminal connected to a voltage source; providing a first power transistor coupled between a voltage source return and a second power terminal of the brushed motor; providing a voltage boost inductor coupled to the voltage source; providing a second power transistor coupled to the brushed motor and the first power transistor; providing a third power transistor coupled between the voltage boost inductor and the voltage source return; providing a power diode coupled between the voltage boost inductor and the second power transistor; rotating the brushed motor in a first rotation direction by turning on the first power transistor and turning off the second power transistor; generating a second rotation direction voltage opposite in polarity to the voltage source by turning on and off the third power transistor; and rotating the brushed motor in a second rotation direction by turning off the first power transistor and applying the second rotation direction voltage to the brushed motor by turning on the second power transistor.

BRIEF DESCRIPTION OF THE DRAWINGS

A more complete understanding of the present disclosure thereof may be acquired by referring to the following description taken in conjunction with the accompanying drawings wherein.

Figure 1:
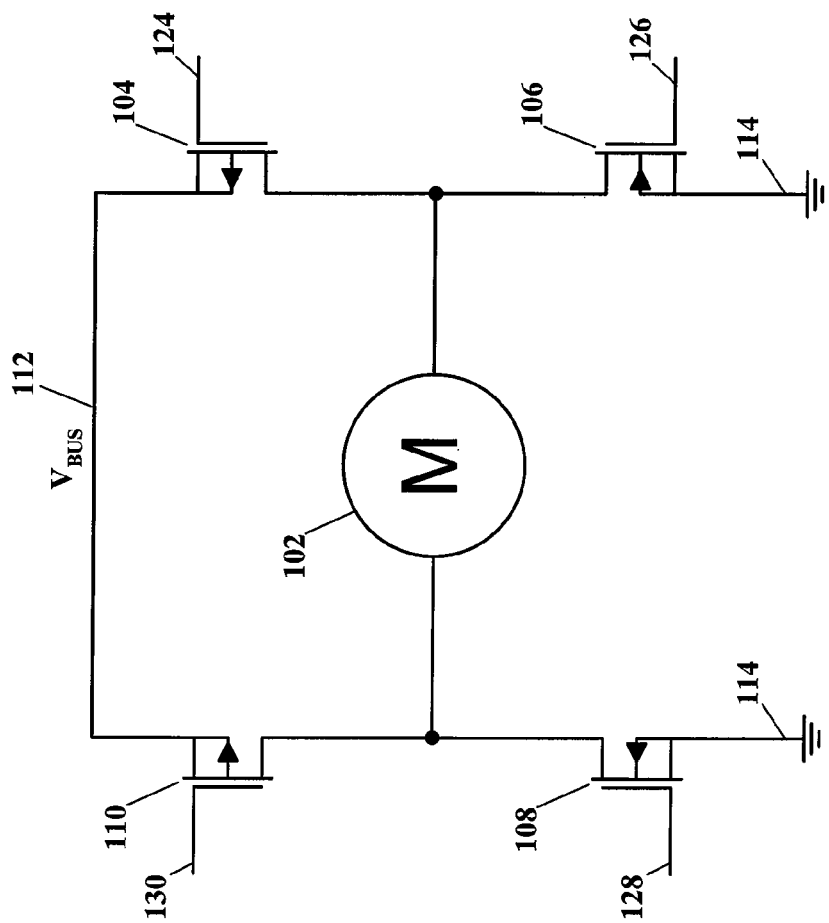
FIG. 1 is a schematic block diagram of a prior technology H-bridge for controlling a motor in forward and reverse directions.
Figure 2:
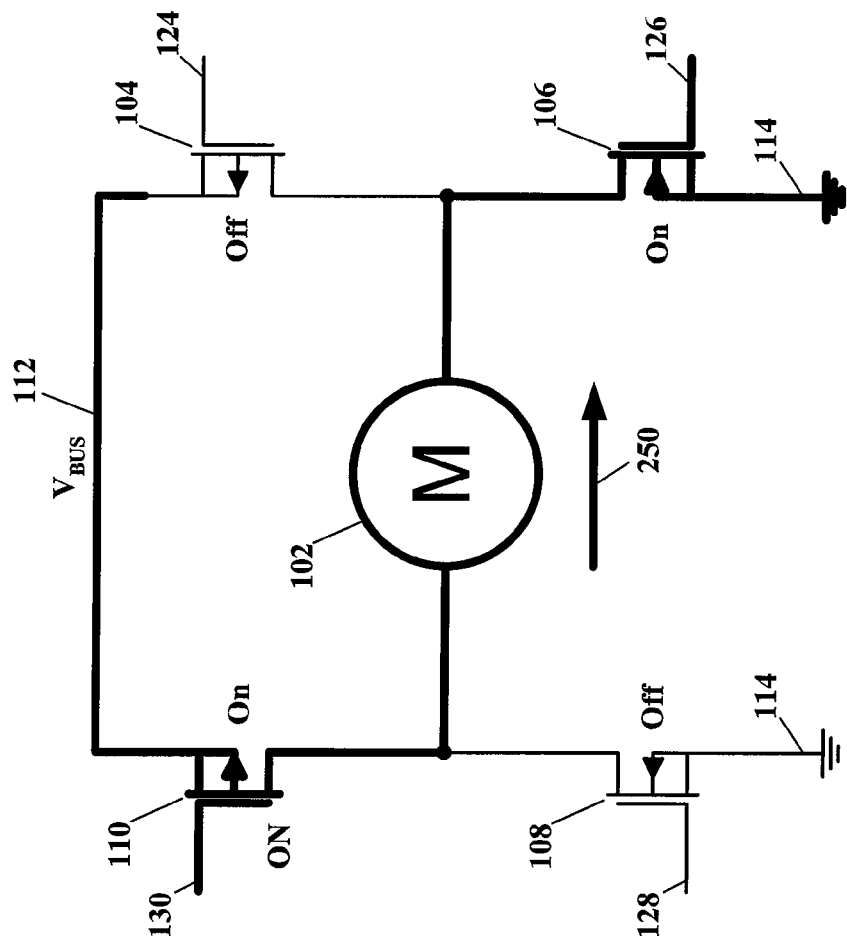
FIG. 2 is a schematic block diagram of the H-bridge of FIG. 1 configured for the forward direction of the motor.
Figure 3:
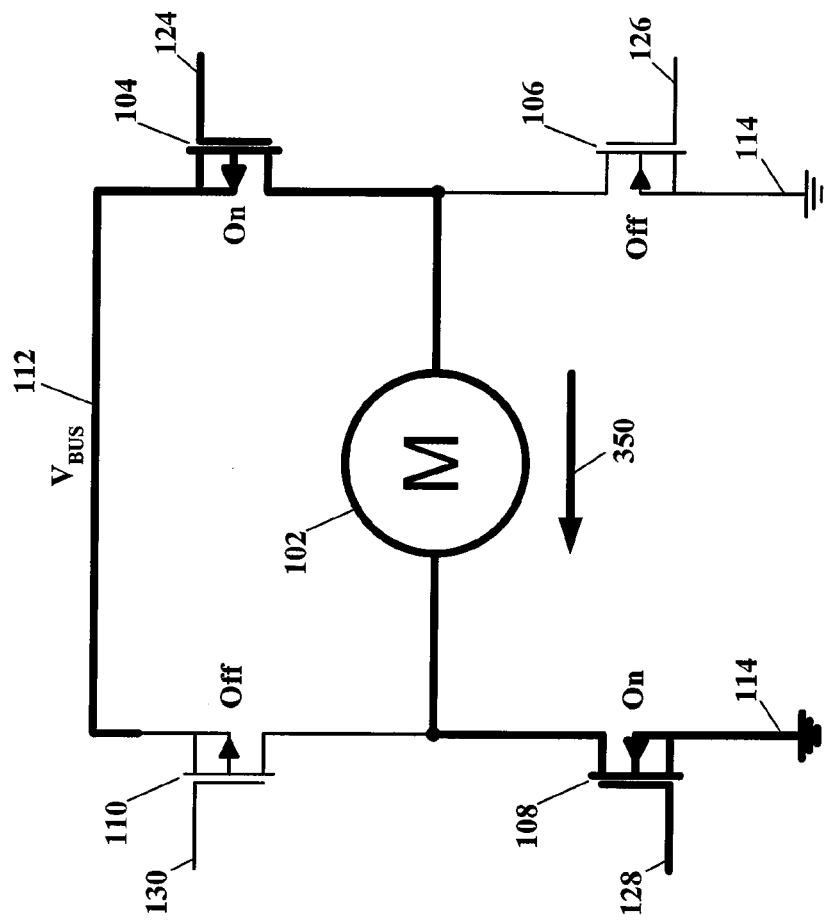
FIG. 3 is a schematic block diagram of the H-bridge of FIG. 1 configured for the reverse direction of the motor.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

Referring now to the drawings, the details of specific example embodiments are schematically illustrated. Like elements in the drawings will be represented by like numbers, and similar elements will be represented by like numbers with a different lower case letter suffix.

Figure 4:
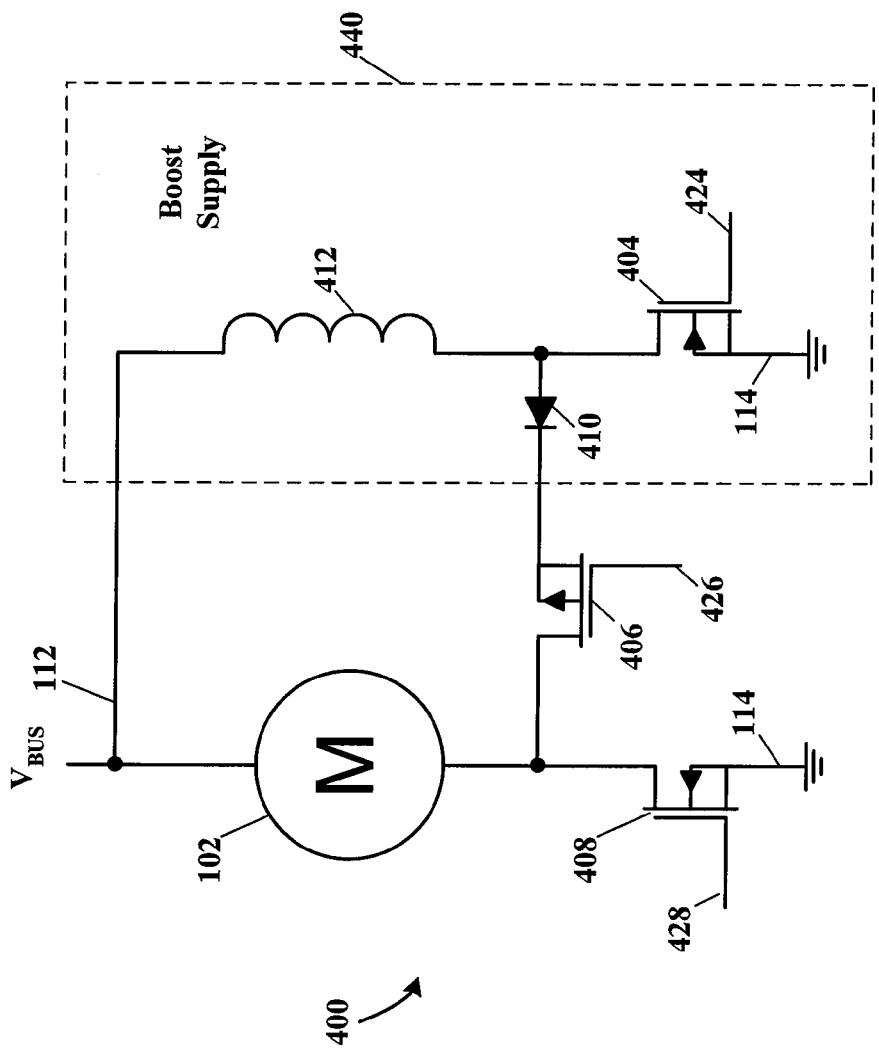
FIG. 4 is a schematic block diagram of a motor controller have efficient forward direction, and with reverse direction and braking capabilities, according to a specific example embodiment of this disclosure.

Referring to FIG. 4, depicted is a schematic block diagram of a motor controller have efficient forward direction control, and with reverse direction and braking control capabilities, according to a specific example embodiment of this disclosure. A motor controller, generally represented by the numeral 400, may comprise a power transistor 408, a power transistor 406 and a boost power supply 440. The boost power supply 440 may comprise a boost inductor 412 a power diode 410 and a power transistor 404. The power transistor 408 is a low side power switch that couples the motor 102 a return (ground or common) 114 of the voltage source 112. The power transistor 404 may be controlled on and off by a control signal at gate input 428. The motor 102 is always connected to the voltage source 112, thus reducing power losses since no switching device is between a power terminal of the motor 102 and the voltage source 112. The inductor 412 may be charged when the power transistor 404 is on, then when the power transistor 404 is off and power transistor 406 is on, the collapsing magnetic field surrounding the inductor 412 will cause a current to flow through the power terminals of the motor 102 in an opposite direction as the motor current flow direction when the power transistor 408 is on. Power transistors 404 and 408 may be controlled on and off by control signals at gate inputs 424 and 428, respectively. It is contemplated and within the scope of this disclosure that the power transistors may be any type of controllable direct current power switch such as power metal oxide semiconductor field effect transistor (MOSFET) and the like.

Figure 5:
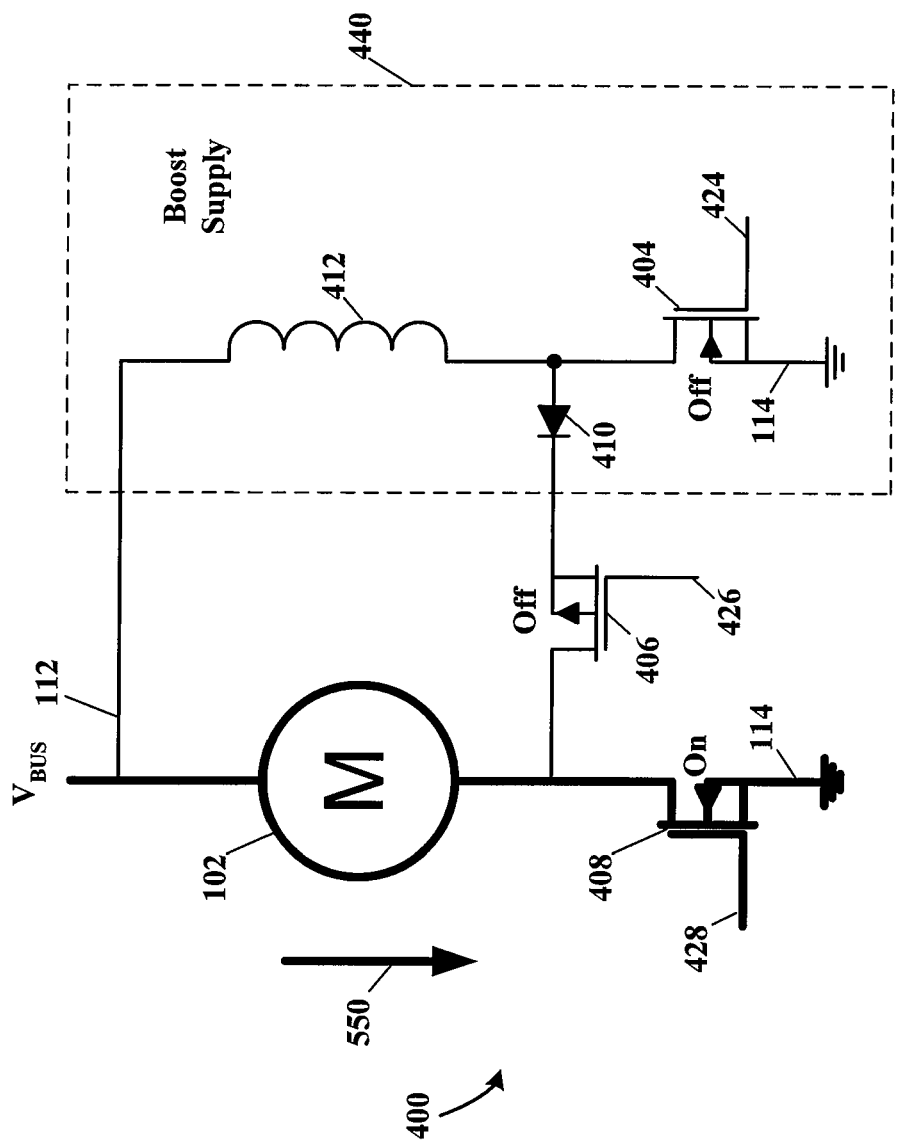
FIG. 5 is a schematic block diagram of the motor controller of FIG. 4 configured for the efficient forward direction, according to the specific example embodiment of this disclosure.

Referring to FIG. 5, depicted is a schematic block diagram of the motor controller of FIG. 4 configured for the efficient forward direction control, according to the specific example embodiment of this disclosure. The motor 102 will rotate in a forward direction when the power transistor 408 is on and current flows in a direction indicated by the arrow 550 (also indicated by heavier lines of the schematic). This produces the most efficient operation of the motor controller 400 (minimal losses) since only one switching power transistor 408 is in series with the motor between the voltage source 112 and the voltage return 114. The power transistor 406 remains off during forward rotation of the motor 102, thus effectively decoupling the voltage boost power supply 440 from the motor 102.

Figure 6:
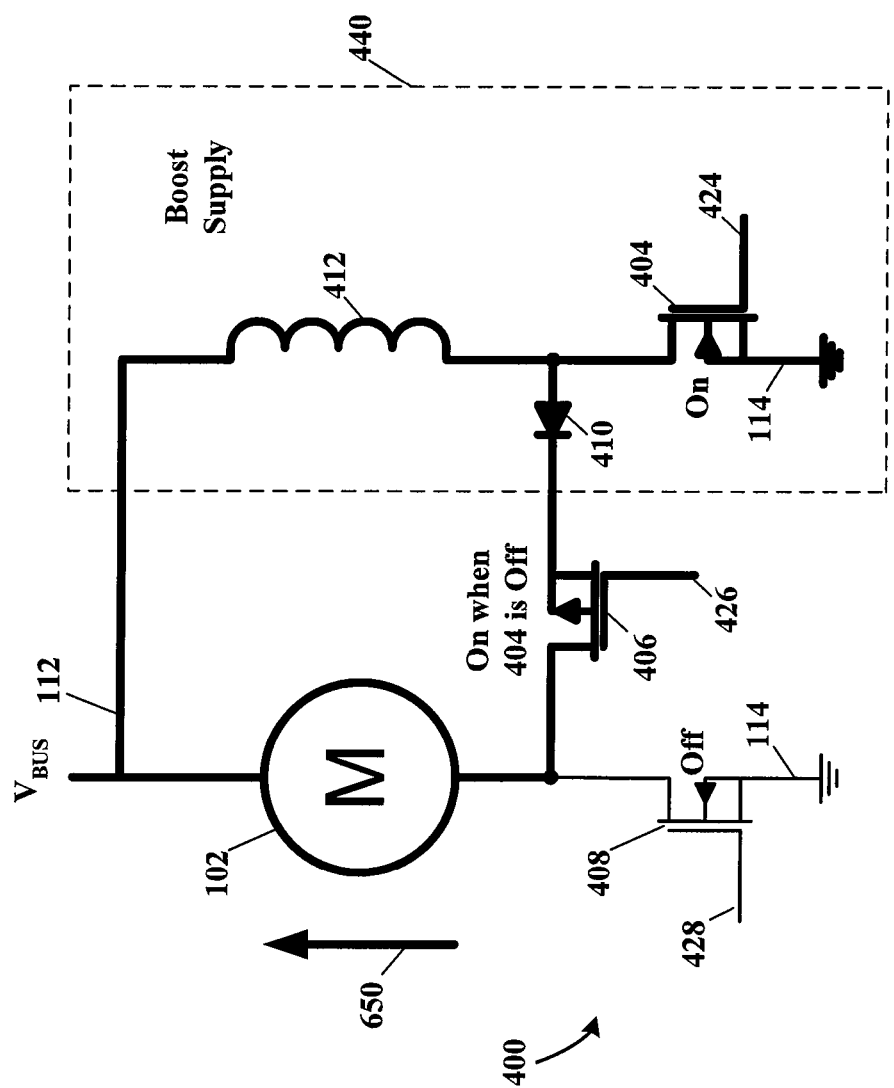
FIG. 6 is a schematic block diagram of the motor controller of FIG. 4 configured for the reverse direction, according to the specific example embodiment of this disclosure.

Referring to FIG. 6, depicted is a schematic block diagram of the motor controller of FIG. 4 configured for the reverse direction control, according to the specific example embodiment of this disclosure. When the power transistor 404 is on, current flows from the voltage source 112 through the inductor 412 and the power transistor 404 to the voltage return 114. This current creates a magnetic field around the inductor 412. When the power transistor 404 is off and the power transistor 406 is on, the magnetic field around the inductor 412 will collapse thereby creating a current flow of an opposite direction, indicated by the arrow 650 (also indicated by heavier lines of the schematic), through the inductor 412, the diode 410, the power transistor 406 and the motor 102. This will cause the motor to reverse rotational direction and/or brake from its forward rotational direction. The power transistors 408, 406 and 404 may be controlled with pulse width modulation (PWM) signals from a digital device (see FIG. 7) applied to the gate inputs 428, 426 and 424, respectively, for control of both rotational speed and direction. The reverse rotational speed and/or braking from a forward rotational direction of the motor 102 may be controlled by the voltage generated from the boost power supply 440. This boost voltage may be controlled with PWM signals from the digital device (see FIG. 7). The boost power supply 440 may be any standard design voltage boost power supply that is well known to those having ordinary skill in the art of switching power supply circuit design.

Figure 7:
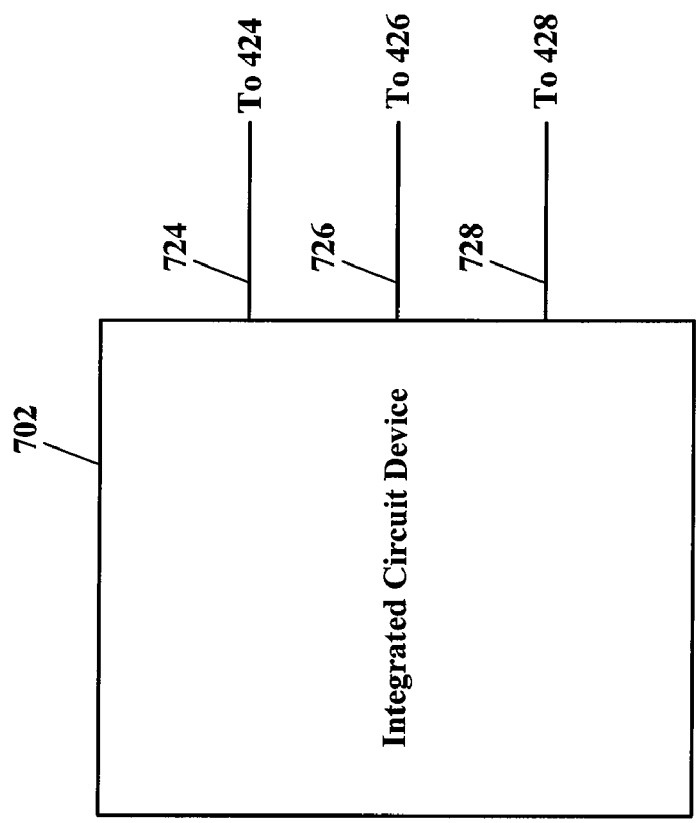
FIG. 7 is a schematic block diagram of a digital device used for controlling the motor controller of FIG. 4, according to the specific example embodiment of this disclosure.

Referring to FIG. 7, depicted is a schematic block diagram of a digital device used for controlling the motor controller of FIG. 4, according to the specific example embodiment of this disclosure. A digital device 702, e.g., microprocessor, microcontroller, digital signal processor (DSP), programmable logic array (PLA), application specific integrated circuit (ASIC), etc., may be used to control the motor controller 400 and/or the boost power supply 440. Outputs 724, 726 and 728 may be coupled to the gate inputs 424, 426 and 428, respectively. The digital device 702 may use PWM signals on any one or all of the outputs 724, 726 and/or 728.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. An apparatus for controlling rotation direction and speed of a brushed motor, comprising:
   a brushed motor having a first power terminal connected to a voltage source;
   a first power transistor coupled between a voltage source return and a second power terminal of the brushed motor;
   a voltage boost inductor;
   a second power transistor;
   a third power transistor; and
   a power diode;
   wherein one end of the voltage boost inductor is coupled to the voltage source, the other end of the voltage boost inductor is coupled to the third power transistor and the power diode, the third power transistor is coupled between the voltage source return and the voltage boost inductor, and the second power transistor is coupled between the power diode and the second power terminal of the motor;
   whereby when the first power transistor is on and the second power transistor is off the brushed motor rotates in a first direction, when the second transistor is on and the first transistor is off the brushed motor rotates in a second direction, and when the third power transistor is on current flows through the voltage boost inductor from the voltage source to the voltage source return.

2. The apparatus according to claim 1, wherein when the third power transistor is on the voltage boost inductor generates a magnetic field such that when the third power transistor is off and the second power transistor is on the voltage boost inductor generates a second rotation direction voltage across the first and second power terminals of the motor so as to cause the motor to rotate in the second direction.

3. The apparatus according to claim 1, wherein a first rotation speed is determined by a pulse width modulation signal controlling when the first power transistor is on and off.

4. The apparatus according to claim 1, wherein a second rotation speed is determined by pulse width modulation signals controlling when the second and third power transistors are on and off.

5. The apparatus according to claim 4, wherein the third power transistor is turned on and off to generate a second rotation voltage across the first and second power terminals of the brushed motor.

6. The apparatus according to claim 5, wherein the second rotation voltage is used for braking the brushed motor.

7. The apparatus according to claim 1, wherein the first, second and third power transistors are power metal oxide semiconductor field effect transistors.

8. The apparatus according to claim 1, further comprising a digital device coupled to and controlling on and off operation of the first, second and third power transistors.

9. The apparatus according to claim 8, wherein the digital device is selected from the group consisting of a microprocessor, a microcontroller, a digital signal processor (DSP), a programmable logic array (PLA), and an application specific integrated circuit (ASIC).

10. A method for controlling rotation direction and speed of a brushed motor, said method comprising the steps of:
    providing a brushed motor having a first power terminal connected to a voltage source;
    providing a first power transistor coupled between a voltage source return and a second power terminal of the brushed motor;
    providing a voltage boost inductor coupled to the voltage source;
    providing a second power transistor coupled to the brushed motor and the first power transistor;
    providing a third power transistor coupled between the voltage boost inductor and the voltage source return;
    providing a power diode coupled between the voltage boost inductor and the second power transistor;
    rotating the brushed motor in a first rotation direction by turning on the first power transistor and turning off the second power transistor;
    generating a second rotation direction voltage opposite in polarity to the voltage source by turning on and off the third power transistor; and
    rotating the brushed motor in a second rotation direction by turning off the first power transistor and applying the second rotation direction voltage to the brushed motor by turning on the second power transistor.

11. The method according to claim 10, wherein the step of generating the second rotation direction voltage comprises the step of generating a magnetic field around the voltage boost inductor by current flowing through the voltage boost inductor and the third power transistor.

12. The method according to claim 10, further comprising the step of controlling a first rotation speed by turning the first power transistor on and off.

13. The method according to claim 12, wherein the step of controlling the first rotation speed includes the step of turning the first power transistor on and off with a pulse width modulation signal.

14. The method according to claim 10, further comprising the step of controlling a second rotation speed by turning the second power transistor on and off.

15. The method according to claim 14, wherein the step of controlling the second rotation speed includes the step of turning the second power transistor on and off with a pulse width modulation signal.

16. The method according to claim 10, further comprising the step of braking the brushed motor with the second rotation direction voltage.

17. The method according to claim 10, further comprising the steps of controlling on and off times of the first, second and third power transistors with a digital device.

18. The method according to claim 17, wherein the steps of controlling on and off times of the first, second and third power transistors with the digital device includes the steps of controlling on and off times of the first, second and third power transistors with pulse width modulation signals from the digital device.

19. The method according to claim 17, wherein the digital device is selected from the group consisting of a microprocessor, a microcontroller, a digital signal processor (DSP), a programmable logic array (PLA), and an application specific integrated circuit (ASIC).

* * * * *